US008808568B2

(12) United States Patent
Shen et al.

(10) Patent No.: US 8,808,568 B2
(45) Date of Patent: Aug. 19, 2014

(54) MAGNETORHEOLOGICAL MATERIALS, METHOD FOR MAKING, AND APPLICATIONS THEREOF

(75) Inventors: Rui Shen, Rochester, NY (US); Hong Yang, Rochester, NY (US); Shai N. Shafrir, Rochester, NY (US); Chunlin Miao, Rochester, NY (US); Mimi Wang, San Marino, CA (US); Joni Mici, Worcester, MA (US); John C. Lambropoulos, Pittsford, NY (US); Stephen D. Jacobs, Pittsford, NY (US)

(73) Assignee: University of Rochester, Rochester, NY (US)

( * ) Notice: Subject to any disclaimer, the term of this patent is extended or adjusted under 35 U.S.C. 154(b) by 410 days.

(21) Appl. No.: 12/575,770

(22) Filed: Oct. 8, 2009

(65) Prior Publication Data
US 2010/0171065 A1 Jul. 8, 2010

Related U.S. Application Data

(60) Provisional application No. 61/103,666, filed on Oct. 8, 2008.

(51) Int. Cl.
C04B 35/26 (2006.01)
C04B 35/64 (2006.01)

(52) U.S. Cl.
USPC .................................... 252/62.59; 252/62.55

(58) Field of Classification Search
USPC ...... 252/62.51 R, 62.55, 62.56, 62.57, 62.58, 252/62.59, 583; 516/80
See application file for complete search history.

(56) References Cited

U.S. PATENT DOCUMENTS

| 4,280,918 | A | * | 7/1981 | Homola et al. ........ 252/62.51 R |
| 4,731,191 | A | | 3/1988 | Swihart |
| 5,063,011 | A | | 11/1991 | Rutz et al. |
| 5,354,488 | A | * | 10/1994 | Shtarkman et al. ........ 252/62.56 |
| 5,578,238 | A | | 11/1996 | Weiss et al. |

(Continued)

OTHER PUBLICATIONS

Magnetorheology definition—www.thefreedictionary.com/magnetorheology.*

(Continued)

*Primary Examiner* — Emily Le
*Assistant Examiner* — Lynne Edmondson
(74) *Attorney, Agent, or Firm* — William Greener; Bond, Schoeneck & King, PLLC

(57) ABSTRACT

A magnetorheological material comprises a magnetic particle and a ceramic material, wherein the magnetorheological material is in a dried form and further wherein a portion of the ceramic material is in the form of a nanocrystalline coating over the entire exterior surface of the magnetic particle and another portion of the ceramic material is in the form of a free nanocrystal. A magnetorheological material comprises a magnetic particle having a ceramic material coating over an external surface thereof as a result of a coating process, and a free nanocrystal of the ceramic material in the form of a residual by-product of the coating process. A sol-gel process for making a magnetorheological product comprises providing a sol of a desired ceramic coating material; combining a desired quantity of carbonyl iron (CI) particles with the sol to coat the CI particles with the ceramic coating material; creating a resulting quantity of nanocrystalline ceramic material-coated CI particles and a quantity of free nanocrystals of the ceramic material; and, drying the resulting quantity of coated CI particles and free nanocrystals to a moisture content equal to or less than 2 wt %.

4 Claims, 9 Drawing Sheets

(56) References Cited

U.S. PATENT DOCUMENTS

Figure 1:
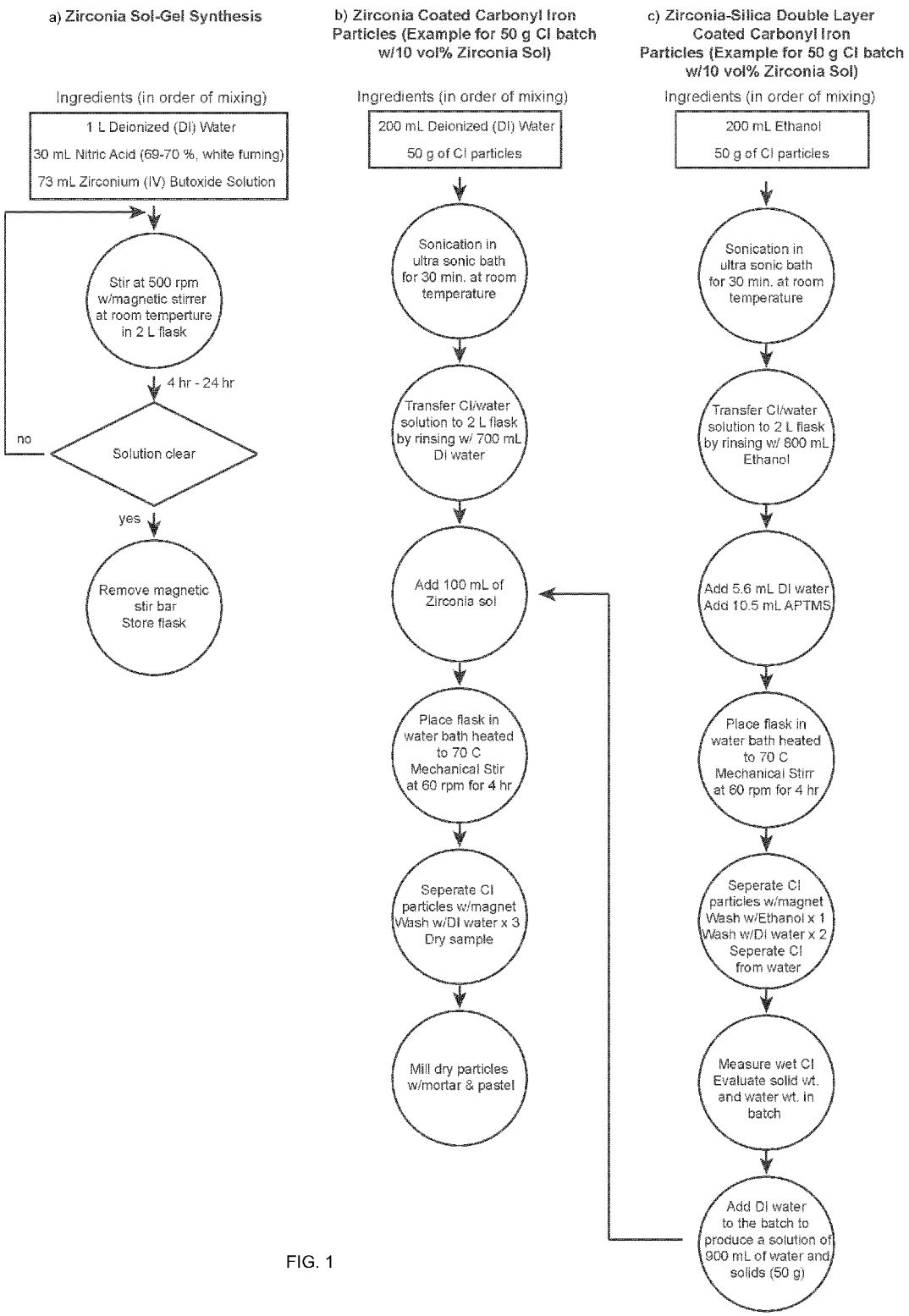

| | | | |
|---|---|---|---|
| 5,599,474 A * | 2/1997 | Weiss et al. | 252/62.52 |
| 5,670,077 A | 9/1997 | Carlson et al. | |
| 5,804,095 A | 9/1998 | Jacobs et al. | |
| 5,971,835 A | 10/1999 | Kordonski et al. | |
| 6,099,389 A | 8/2000 | Nichols et al. | |
| 6,106,380 A * | 8/2000 | Jacobs et al. | 451/360 |
| 6,280,658 B1 * | 8/2001 | Atarashi et al. | 252/572 |
| 6,440,322 B1 * | 8/2002 | Kim et al. | 252/62.52 |
| 6,920,765 B2 | 7/2005 | Menapace et al. | |
| 6,929,757 B2 | 8/2005 | Ulicny et al. | |
| 2007/0151417 A1 * | 7/2007 | Kaneko et al. | 75/252 |
| 2008/0038991 A1 | 2/2008 | Hunter et al. | |
| 2008/0185554 A1 | 8/2008 | Ulicny et al. | |

OTHER PUBLICATIONS http://en.widipedia.org/wiki/Colloidal_crystal (wikidpedia definition of colloidal crystals including silica).*

Begna et al., Colloidal Silica Fundamentals and Applications, 2006, CRC Taylor and Francis, pp. 1, 5, 11, 12 and 267.* http://www.alibaba.com/product-gs/594299009/Crystal_silica_gel.html?s=p (product details for crystal silica gel), 2013.* http://www.alibaba.com/product-gs/1221972885/Crystalline_silica_fume.html (product detaqils for crystalline silica fume), 2013.*

Yakovleva et al.; Potential Use of Zirconium Dioxide in Optical Glass Polishing; Soviet Journal of Optical Technology; vol. 41, No. 1; Jan. 1974; 44-45.

Atarashi et al.; Synthesis of Ethylene-Glycol-Based Magnetic Fluid Using Silica-Coated Iron Particle; Journal of Magnetism and Magnetic Materials; 201 (1999); 7-10.

Booij et al.; Nanometer Deep Shaping with Fluid Jet Polishing; Opt. Eng. 41(8); 1926-1931; (Aug. 2002).

Brescia et al.; Fundamentals of Chemistry; 430; Academic Press (1966).

Exarhos et al.; Laser-Induced Damage in Optical Materials; SPIE vol. 3224; 356-364; 1997.

Degroote et al.; Polishing PMMA and Other Optical Polymers with Magnetorheological Finishing; SPIE 5180; Aug. 3, 2003; 1-12.

Fang et al.; Polymeric Nanobead Coated Carbonyl Iron Particles and Their Magnetic Property; phys. stat. sol. (a) 204; No. 12; 4190-4193 (2007).

Fahnle et al.; Fluid Jet Polishing of Optical Surfaces; Oct. 1, 1998; vol. 37, No. 28; Applied Optics; 6771-6773.

Friederang, A.W.; Metal Powder Report; vol. 53; Mar. 1999; 18-20.

Gilroy et al.; The Inhibition of the Corrosion of Iron in Alkaline Solutions; Brit. Corros. J.; 1966, vol. 1; January; 161-165.

Jang et al.; Role of Organic Coating on Carbonyl Iron Suspended Particles in Magnetorheological Fluids; Journal of Applied Physics 97, 10Q912-3 (2005).

Jones, Denny A.; Principles and Prevention of Corrosion; Department of Chemical and Metallurgical Engineering University of Nevada, Reno; 1996, 1992 Prentice-Hall, Inc.; 50-74.

Lo et al.; Rapid Enrichment of Phosphopeptides from Tryptic Digests of Proteins Using Iron Oxide Nanocomposites of Magnetic Particles Coated with Zirconia as the Concentrating Probes; Journal of Proteome Research 2007, 6,887-893.

Menapace et al.; Combined Advanced Finishing and UV-Laser Conditioning for Producing UV Damage Resistant Fused Silica Optics; Lawrence Livermore National Laboratory; Nov. 2001.

Pu et al.; Studies on Preparation and Chemical Stability of Reduced Iron Particles Encapsulated with Polysiloxane Nano-Films; Material Letters 60 (2006) 94-97.

Tyagi et al.; Synthesis of Nanocrystalline Zirconia Using Sol-Gel and Precipitation Techniques; Ind. Eng. Chem. Res. 2006, 45, 8643-8650.

Ulicny et al.; Magnetorheological Fluid Durability Test-Iron Analysis; Materials Science and Engineering A443 (2007) 16-24.

Ulicny et al.; Evaluation of Electroless Nickel Surface Treatment for Iron Powder Used in MR Fluids; Materials Science and Engineering A369 (2004) 309-313.

Wu et al.; The Strengthening Effect of Guar Gum on the Yield Stress of Magnetorheological Fluid; Smart Mater. Struct. 15 (2006) N94-N98.

Park et al.; A Study on the Chemical Mechanical Polishing of Oxide Film Using a Zirconia (ZrO2)-Mixed Abrasive Slurry (MAS); Microelectronic Engineering 85 (2008) 682-688.

Towery et al.; Chemical Mechanical Polishing of Polymer Films; Journal of Electronic Materials; vol. 27, No. 10, 1998; 1088-1094.

* cited by examiner

MAGNETORHEOLOGICAL MATERIALS, METHOD FOR MAKING, AND APPLICATIONS THEREOF

RELATED APPLICATION DATA

This application claims priority to U.S. provisional application Ser. No. 61/103,666 filed on Oct. 8, 2008, the subject matter of which is incorporated herein by reference in its entirety.

GOVERNMENT SPONSORSHIP

This invention was made with government support under U.S. Army Cooperative Agreement Number W15QKN-06-2-0104 and by the U.S. Department of Energy Office of Inertial Confinement Fusion under Cooperative Agreement Number DE-FC52-08NA28302. The government may have rights in this invention.

TECHNICAL FIELD

Embodiments of the present invention relate generally to magnetorheological materials, methods for making magnetorheological materials, and applications of such magnetorheological materials. More particularly, embodiments of the invention pertain to nanocrystalline ceramic-coated magnetorheological materials having free ceramic nanocrystallites, methods for making such nanocrystalline ceramic-coated magnetorheological materials having free ceramic nanocrystallites, and applications of such nanocrystalline ceramic-coated magnetorheological materials having free ceramic nanocrystallites, e.g., optical polishing applications. Most particularly, embodiments of the invention pertain to nanocrystalline zirconia-coated carbonyl iron particles having free zirconia nanocrystallites, methods for making such nanocrystalline zirconia-coated carbonyl iron particles having free zirconia nanocrystallites, and applications of such nanocrystalline zirconia-coated carbonyl iron particles having free zirconia nanocrystallites.

BACKGROUND

Magnetorheological finishing (MRF) is a polishing technology that uses a magnetorheological (MR) fluid. MRF was commercialized in 1997 by QED Technologies and is considered to be an excellent, deterministic process for finishing optics to high precision. A variety of CNC machines and MR fluids are used throughout the world on a regular basis.

MR fluids are the key element of MRF technology. In general, MR fluids consist of uniformly dispersed non-colloidal magnetic particles, e.g., carbonyl iron (CI) in a carrier fluid. Properties like plasticity, elasticity, and apparent viscosity change with the application of magnetic field. A typical MR fluid for MRF applications is compatible with most optical substrates, providing relatively high removal rates and acceptable smoothing for precision optics applications, without the risk of scratching the workpiece surface due to oversized abrasive particles, as may happen with a solid lap. Material removal is accomplished primarily by non-magnetic abrasive particles incorporated in the MR fluid.

The two current commercial MR fluid options contain either cerium oxide ($CeO_2$) or nano-diamonds as non-magnetic polishing abrasives. The choice of non-magnetic abrasive material is determined by the physical properties (e.g., hardness) and chemical properties (e.g., chemical durability) of the workpiece to be finished.

MRF is a subaperture polishing process. For a conventional MRF setup, the MR fluid is pumped through a delivery system and ejected through a nozzle in the form of a ribbon onto a rotating vertical wheel. The ribbon stiffens upon passing into a region with a high magnetic field in the vicinity of the workpiece. The MRF removal function is characterized by a D-shaped polishing spot in the zone of contact between the ribbon and the workpiece, and the material removal rate is determined by the time of contact (e.g., dwell time), as well as other process and workpiece parameters. The temperature of the MR fluid is controlled by a chiller normally set to ~20 degrees C.

The MRF removal function is very sensitive to the stability of the MR fluid. Changes in MR fluid properties can reduce the determinism of MRF over time (the nominal life time of a standard MR fluid is approximately two weeks compared to three to four months with a polyurethane polishing pad). Stabilizers, such as glycerol may be added to improve fluid stability (i.e., control viscosity and keep both magnetic and non-magnetic particles in suspension). However, for glass polishing, an excess amount of glycerol inhibits the water hydration at the workpiece surface which is needed for softening the glass surface.

Even though the MR fluid has only limited exposure to atmosphere, it can still absorb carbon dioxide, which lowers the pH of the fluid and contributes to the oxidation of CI. Corrosion may cause the MR fluid to change its compositional properties, which subsequently result in an unpredictable MRF removal function. Using deionized (DI) water as the carrier fluid provides only a limited solution to the problem. The use of buffers such as sodium carbonate ($Na_2CO_3$) increase the fluid pH to ~10, resulting in a more stable fluid. $Na_2CO_3$ reduced the corrosion problem sufficiently to allow for the development of a commercial MR fluid for MRF.

Many coating and surface treatments have been applied to CI particles for use as MR fluids in industrial applications (e.g., vibration dampers, clutches, and actuating modules) to achieve benefits including improved sedimentation stability, improved dispersability, improved oxidation and corrosion resistance, and stability at higher solids concentrations. Coating media that have been explored include non-magnetic metals, ceramics, high performance thermoplastics, thermosetting polymers, polyvinyl butyral, polystyrene nano-spheres, silicon, phosphates, metal oxides like silica and zirconia, and combinations of some of the above. Enhancement of the particle surface with nitrogen has also been reported. Of the many coating application methods employed, the sol-gel method has often been used, because it is suited to a variety of materials and offers excellent process control.

For most optical finishing applications a water based MR fluid is used. As mentioned previously, the commercial MR fluids contain non-magnetic abrasive such as $CeO_2$ and diamonds to enhance material removal and to control final surface roughness for a wide range of optical materials.

Water soluble crystals have important applications in optics. One example is potassium dihydrogen phosphate (KDP/$KH_2PO_4$), whose solubility is ~21.7 g/100 g water at room temperature. KDP is the only nonlinear single crystal electro-optical material that can be grown in sizes large enough for use as a switch or as a frequency converter in solid state lasers used for investigating inertial fusion, such as the OMEGA and OMEGA EP at the Laboratory for Laser Energetics (LLE) of the University of Rochester, and the National Ignition Facility (NIF) at Lawrence Livermore National Laboratories (LLNL). It has been reported that a non-aqueous MR fluid composed of 40 vol. % CI, 0.05 vol. % nano-diamonds, and ~60 vol. % dicarboxylic ester (DAE) as the carrier fluid could successfully polish a previously diamond turned KDP part to an rms surface roughness of ~2 nm, removing all diamond turning marks.

Substituting the conventional non-magnetic abrasives in an MR fluid (i.e., $CeO_2$ or nano-diamonds) with other commercial polishing abrasives may result in improved surface smoothing of relatively soft materials.

It has been reported that an MR fluid containing mechanically soft CI (~4 μm diameter) and alumina abrasives could yield improved surface roughness for chemical vapor deposition (CVD) polycrystalline zinc sulfide (ZnS). This chemically altered MR fluid composition also showed no significant dependence on the initial surface preparation (single point diamond turning, pitch polishing, or deterministic microgrinding).

Zirconia ($ZrO_2$) is a hard polishing abrasive used in conventional polishing of hard and soft glasses. Monoclinic zirconia is the preferred crystalline form for glass polishing, although cubic zirconia is also used. Excellent removal rates and surface roughness values have been reported for polymer [poly(arylene)ether] using 50 nm zirconia in comparison to ceria ($CeO_2$), silicon oxide ($SiO_2$), and tin oxide ($SnO_2$). Fused silica (FS) polished with zirconia has been shown to leave surfaces that, upon laser damage testing in the UV and at 355 nm, exhibit superior damage resistance compared to surfaces polished with other abrasives. Applications for such surfaces exist in UV/DUV/EUV lithography for the semiconductor wafer industry, and in research laboratories exploring inertial confinement fusion. A polishing slurry consisting of a blend of zirconia and fumed silica was recently found optimal for chemical mechanical polishing (CMP) of a tetra-ethyl orthosilicate (TEOS) layer on a silicon wafer. The advantages of loose zirconia abrasives in conventional polishing have been reported in the literature.

The inventors have recognized a need for improved MR materials and processes for making such improved MR materials as well as the ability to manufacture these MR materials in batches of sufficient quantity for cost efficiency and usefulness. There also remains a need to provide improved corrosion resistance and life-stability for MR fluids, particularly for those used in the optical polishing field. It would be beneficial to provide novel MR materials and fluids having a variety of uses and applications.

SUMMARY OF THE INVENTION

An embodiment of the invention is a magnetorheological material made up of a magnetic (magnetizable) particle and a ceramic material, wherein a portion of the ceramic material is in the form of a nanocrystalline coating over the entire exterior surface of the magnetic particle and another portion of the ceramic material is in the form of a free nanocrystal that may or may not be attached to the coated magnetic particle. According to various aspects, the free nanocrystal may be in the form of single crystals, aggregates, or agglomerates. According to various aspects, the ceramic material may include zirconia, alumina, ceria, tin oxide, titanium oxide, cerium oxide, iron oxides (including maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, or a combination of two or more of the foregoing. According to various aspects, a coating of zirconia, alumina, ceria, tin oxide, titanium oxide, cerium oxide, iron oxide (e.g., maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, or a combination of two or more thereof may be disposed immediately intermediate the exterior surface of the magnetic particle and the nanocrystalline coating referred to above. According to an exemplary aspect, the magnetic particle is carbonyl iron (CI) and the ceramic material is zirconia. According to an exemplary aspect, the magnetorheological material is nanocrystalline zirconia-coated carbonyl iron (CI) having a coating layer of silica intermediate the CI and the zirconia coating, and free zirconia nanocrystals. According to an aspect, the magnetorheological material may be a magnetorheological fluid that includes a magnetorheological material as described above and a carrier fluid in a mixture thereof. In an exemplary aspect, the carrier fluid is water (e.g., distilled water). According to an aspect, the magnetorheological fluid may include a dispersant.

An embodiment of the invention is a magnetorheological material comprising a magnetic particle having a ceramic material coating over an external surface thereof as a result of the coating process and a free nanocrystal of the ceramic material in the form of a residual by-product of the coating process. According to an exemplary aspect, the magnetorheological material is nanocrystalline zirconia-coated carbonyl iron (CI) made by a sol-gel process and having free zirconia nanocrystals as a by-product of the sol-gel process. In a further exemplary aspect, the magnetorheological material is nanocrystalline zirconia-coated carbonyl iron (CI) made by a sol-gel process, including an intermediate sol-gel-formed coating layer of silica, and having free zirconia nanocrystals as a by-product of the sol-gel process, wherein the silica layer may be used to modify the roughness of the nanocrystalline zirconia coating. In various aspects, the ceramic material may include zirconia, alumina, ceria, tin oxide, titanium oxide, cerium oxide, iron oxide (e.g., maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, or a combination of two or more thereof. In various aspects, the ceramic-material-coating-roughness-modifying layer may include zirconia, alumina, ceria, tin oxide, titanium oxide, cerium oxide, iron oxide (e.g., maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, or a combination of two or more thereof. According to an aspect, the magnetorheological material may be a magnetorheological fluid that includes a magnetorheological material as described above an a carrier fluid in a mixture thereof. In an exemplary aspect, the carrier fluid is water (e.g., distilled water). According to an aspect, the magnetorheological fluid may include a dispersant.

An embodiment of the invention is a sol-gel process for making a magnetorheological product. The process generally involves the steps of providing a sol of a desired ceramic coating material; combining a desired quantity of carbonyl iron (CI) particles with the sol to coat the CI particles with the ceramic coating material; creating a resulting quantity of nanocrystalline ceramic material-coated CI particles and a quantity of free nanocrystals of the ceramic material; and drying the resulting quantity of coated CI particles and free nanocrystals to a moisture content equal to or less than 2 wt %. According to an aspect, the process further includes milling the dried particles to form a uniform powder. According to an aspect, the process further includes combining the dried powder only with water to thereby form an abrasive-charged, ready-to-use, magnetorheological polishing fluid. According to an exemplary aspect, the drying step involves actively (i.e., more than mere 'passive' exposure to ambient air) drying the resulting quantity of coated CI particles to a moisture content equal to or less than 1 wt %. Non-limiting, exemplary drying processes and apparatus may include the use of heating lamps in a hood, the use of a hot plate in a hood, blowing hot air with a fan mechanism in a hood, and others, some of which may be used more effectively to dry larger sized batches at a time. In an exemplary aspect, the process involves providing a zirconia sol and thereby creating zirconia-coated CI particles and free nanocrystalline zirconia. According to an aspect, the process may further involve adjusting the thickness of the nanocrystalline zirconia coating on the coated CI particles by controlling the amount of the zirconia sol combined with the CI particles. According to an aspect, the process may further involve adjusting the size and shape of the nanocrystals of the nanocrystalline zirconia coating on the coated CI particles by controlling the amount of the zirconia sol combined with the CI particles. According to an aspect, the process may further involve adjusting an amount of nitric acid comprising the zirconia sol. In an exemplary aspect, the process involves using a zirconia sol between about 5 v/v % to 50 v/v %. According to an aspect, the process may further involve combining a dried powder of the coated CI particles and free zirconia nanocrystals only with water to thereby form an abrasive-charged, ready-to-use, magnetorheological polishing fluid.

Another embodiment of the invention is directed to the use of a magnetorheological polishing fluid for polishing an optical surface, wherein the use involves using a magnetorheological polishing fluid consisting of nanocrystalline zirconia-coated CI particles and free zirconia nanocrystals in a mixture with water. The MR fluid may include a dispersant.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which:

FIGS. 1(*a, b, c*) show flowcharts of exemplary protocols used to prepare zirconia single layer and zirconia/silica double layer coatings using a sol gel technique, according to illustrative embodiments of the invention;

FIG. 2 shows SEM images of (a) as-received and (b) zirconia-coated small CI particles made from a 50% zirconia sol according to an illustrative embodiment of the invention;

FIG. 3 shows SEM images of $ZrO_2$ coated small CI particles with different amounts of sol precursors: (a) 10% and (b) 16%, according to illustrative aspects of the invention;

FIG. 4 shows SEM images of $SiO_2$—$ZrO_2$ coated CI particles made with different (a) 5%, (b) 10%, (c) 20% and (d) 30% zirconia sol precursors, respectively, according to illustrative aspects of the invention;

FIG. 5 shows a representative SEM image of the cross-section of coated CI particles showing the core-shell structure and the shape of zirconia crystals in the coating layers. The coated CI particles were made from 10 vol. % zirconia/silica sol solutions, according to an illustrative aspect of the invention;

FIG. 6 shows SEM images of zirconia-coated CI particles prepared with different amounts of zirconia sol and $HNO_3$ catalyst in 1-L water: a) 5 vol % of sol and 36.5 mL of $HNO_3$, b) 10 vol % sol and 36.5 mL of $HNO_3$, c) 5 vol % of sol and 146 mL of $HNO_3$, and d) 10 vol % of sol and 146 mL of $HNO_3$, according to illustrative aspects of the invention;

FIG. 7 shows TGA curves of various zirconia-coated CI particles: (a) weight loss/gain and (b) heat flow as a function of temperature in experiments performed in an air flow at a rate of 50 mL/min, according to illustrative aspects of the invention;

FIG. 8 shows accelerated acid corrosion tests and SEM characterizations of (a-b) uncoated and (c-d) coated CI particles in an acidic solution of pH 4.4. a) Colorimetric test for uncoated CI particles exposed for up to 1 h at 30 C; b) SEM image of an uncoated particle after 20 min of exposure at 60 C; c) colorimetric test showing no corrosion for particles coated with silica/zirconia (50 vol %) after acidic treatment of up to 15 h at 60 C; and d) SEM image of zirconia (10 vol %) coated CI showing no obvious pitting after acid treatment of 150 h at 60 C, according to illustrative aspects of the invention; and FIG. 9 shows a vacuum funnel drying apparatus according to an illustrative aspect of the invention.

DETAILED DESCRIPTION OF EMBODIMENTS OF THE INVENTION

According to a non-limiting, exemplary embodiment of the invention, a magnetorheological material comprises carbonyl iron (CI) particles that are substantially entirely or entirely coated with nanocrystalline zirconia and further includes free zirconia nanocrystallites in the form of single crystals, aggregates, and/or agglomerates, in the form of a dry product having 2 weight % moisture or less.

FIGS. 1*a*, 1*b* show the steps for preparing, via a sol-gel synthesis procedure, a 200 g batch of zirconia coated CI at 10 vol. % zirconia sol and free nanocrystalline zirconia according to a non-limiting, exemplary embodiment of the invention. The first step is the preparation of a zirconia sol. As shown in FIG. 1*a*, the zirconia sol was prepared by mixing 1,000 mL of DI water [$H_2O$], 73 mL of zirconium (IV) butoxide [$Zr(OC_4H_9)_4$], and 30 mL of nitric acid [$HNO_3$] at room temperature, to produce ~1,100 mL of sol. The mixing process is completed when the solution is clear (pH ~1).

As illustrated by FIG. 1*b*, a 200 g batch of zirconia coated CI at 10 vol. % zirconia sol was prepared by the following steps:

a) CI powder (200 g) was dispersed in DI water (600 mL) in a 2 L flask;

b) The mixture/flask was placed in an sonication bath for 30 min at room temperature;

c) The flask was then placed in a water bath on top of a hot plate and the mixture was agitated using a mechanical stirrer (~60 rpm);

d) Zirconia sol (400 mL) was added to the flask containing the CI and water;

e) The water bath temperature was set to 70° C. and was left to stir for 4 h after which the hot plate was turned off and the mixture continued to stir overnight;

f) The zirconia coated CI particles were separated out from the liquid mixture (~10 pH) using a magnet, and washed three times with ~2 L of DI water and Ethanol;

g) The particles were dried in an aluminum foil pan in a fume hood for 2-3 days, to a moisture level of less than 2 wt. %;

h) The dried particles were then milled by hand with a mortar and pestle to form a uniform powder.

The free nanocrystalline ceramic particles formed by the sol-gel process constitute loose polishing abrasives in their own right. The coating process therefore generates a loose polishing abrasive accompanying the coated magnetizable particles, thus eliminating the need to add loose polishing abrasives to the batch during preparation of an MR polishing fluid. The free nanocrystalline zirconia produced in our experiments ranged in size from about 5 nm to about 200 nm and from about 0.1 vol. % to about 5 vol. % in the MR material. Non-limiting examples of the free nanocrystalline particle materials are the same as the ceramic coating materials described herein below.

It is to be appreciated that sonication is not a limiting mixing/dispersing mechanism as set forth in step (b) above; rather, any mixing/blending protocol such as mechanical stirring, vibrational agitation, sonication and/or combinations of these should be considered viable process mechanisms.

It is to be further appreciated that the coating process is not limited to the sol-gel technique. Other known techniques including, but not limited to, non-hydrolytic or non-aqueous synthesis and gas-phase synthesis may be used for the coating process.

The inventors have further determined that the (passive) drying process as set forth in step (g) above may not be an optimum technique under all circumstances. Since the process takes two to three days to dry the particles to a moisture content of 2-3 wt %, it is quite time consuming. It also may involve variables that are difficult or impossible to control (e.g., contamination), cannot feasibly be replicated in a commercial environment, limits fume hood space, and restricts the moisture weight percent of the particles to 2 wt %. Moreover, the drying process as described in step (g) above may be ineffective in producing coated CI particles that are corrosion resistant in an acidic environment (pH ~4).

Alternative drying processes implemented after the washing step (f) above to actively dry the particles to 1 wt % moisture or less may include the use of heating lamps in a hood, the use of a hot plate in a hood, blowing hot air with a fan mechanism in a hood, and others, some of which may be used more effectively to dry larger sized batches at a time.

Figure 9:
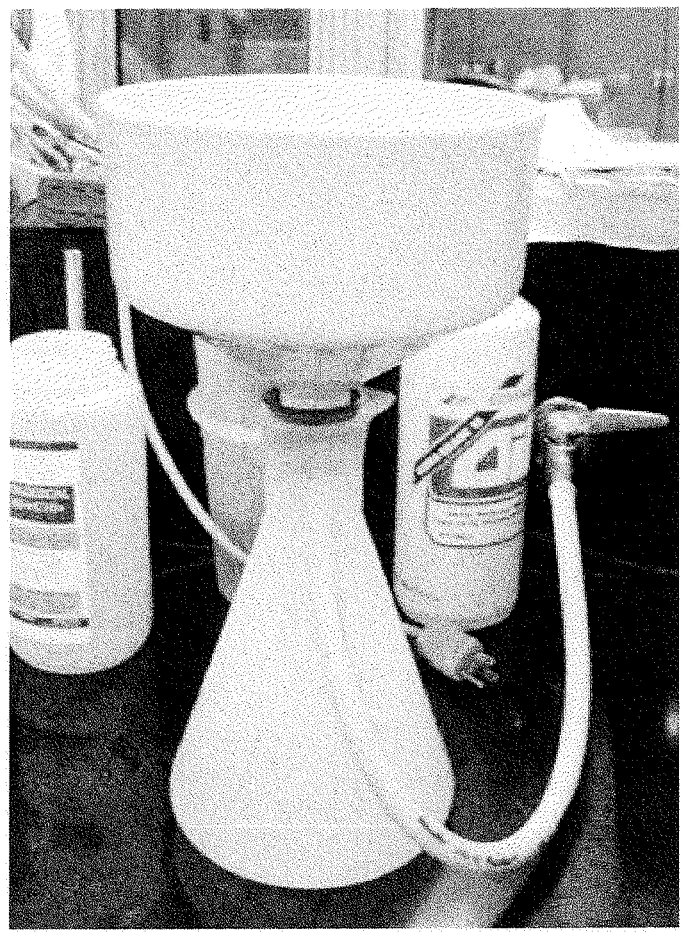

A non-limiting, illustrative drying technique and apparatus is described with reference to FIG. 9, which shows a 'vacuum funnel' apparatus. The apparatus consists of a vacuum funnel (Buchner Filter Funnel VWR Cat No 89038-130) inserted into a 4 L filtering flask (VWR Cat No 89090-736). The funnel is inserted with rubber seal gaskets to ensure an airtight seal with the flask. The flask has a connection on the side which the vacuum tap on a lab-bench can be attached to allow for suction from the funnel into the flask. The top of the funnel is covered with a 1-5 um filter (Fisherbrand Filter Paper Cat No 09-803-5f) to prevent CI particles from flowing through the funnel. The process continues as follows:

a) Pour approximately 40 mL of ethanol over the washed particles in the 190×100 VWR glass dish (not shown). Slowly pour the entire batch (~200 g) of cleaned particles into the top of vacuum filter system. The particles should be distributed evenly over the surface of the filter;

b) As the particles are drying in the funnel, pour DI water over the particles to smooth the surface and aid in uniform drying around the edges of the funnel. Use a small amount of DI Water (~200 mL) to accomplish this step; smooth out cracks;

c) Prepare a tray for the CI by wrapping a Petri dish (Kimex 15 cm diameter) in aluminum foil;

d) After 60 minutes of drying, the CI in the vacuum funnel should achieve a cake-like consistency. Carefully remove the CI from the funnel using gloves or a rubber spatula to avoid tearing the filter underneath the CI particles. Distribute the CI evenly in the previously prepared tray. Break up the cakelike CI with a small metal spatula and spread it to a layer approximately 2 cm thick in the tray;

e) Set the VWR 1410 vacuum-oven to 60 C and place the tray in the oven. Turn on the vacuum pump to a negative pressure of 20 mm Hg. Leave the sample in the oven overnight; and f) Test the moisture of the samples after 24 hours. If the samples are at (or below) 1 wt % moisture, then remove them from the oven. If not, leave the samples in the oven, testing periodically, until the samples reach the target moisture level.

Figure 2:
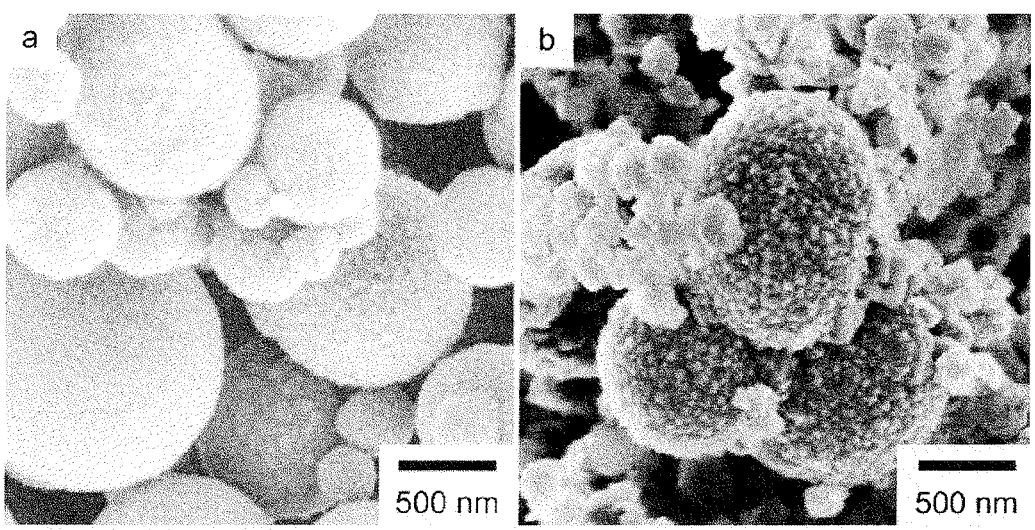

FIGS. 2a, 2b, respectively, show SEM images of as-received and $ZrO_2$-coated small CI particles. The as-received CI particles are spherical and have nanometer (nm)-sized features on the surface as shown in FIG. 2a. The uncoated CI particles were polydisperse and the mean diameter was around 1 μm. In the procedure of direct coating, zirconia was formed through the hydrolysis and polycondensation of zirconium alkoxide precursors using base catalyst according to the following general steps:

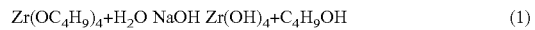

$$Zr(OC_4H_9)_4 + H_2O \xrightarrow{NaOH} Zr(OH)_4 + C_4H_9OH \quad (1)$$

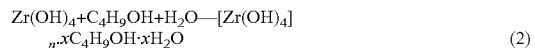

$$Zr(OH)_4 + C_4H_9OH + H_2O \longrightarrow [Zr(OH)_4]_n \cdot xC_4H_9OH \cdot xH_2O \quad (2)$$

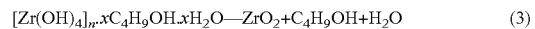

$$[Zr(OH)_4]_n \cdot xC_4H_9OH \cdot xH_2O \longrightarrow ZrO_2 + C_4H_9OH + H_2O \quad (3)$$

The thickness of the ceramic coating ranged from about 20 nm to about 100 nm.

FIG. 2b shows the SEM image of zirconia coated CI particles. The coating was composed of highly faceted nanocrystals that were distinguishably different from the original surfaces of CI particles. Free zirconia crystals could be observed in the product and the typical size was on the order of 100 nm.

Figure 3:
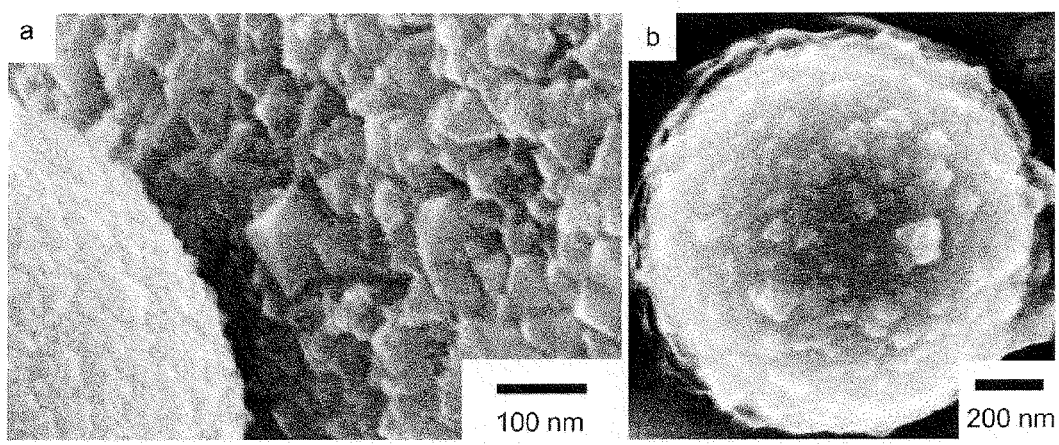

Various amounts of zirconia sol ranging from 5 to 50 v/v % were used to produce coated CI particles, resulting in various amounts of free zirconia crystals. FIG. 3 shows the SEM images of the coating layers in which the morphology changed according to the concentration of zirconia sol used. At sol concentration of 10 and 16 vol %, as shown in FIGS. 3a, 3b, respectively, the coating was neat with few free zirconia nanoparticles formed. The coatings appear to be made of faceted zirconia nanoparticles that had shapes with edges and overgrew to form a continuous coverage of CI particles. The higher the concentration of zirconia sol that was used, the larger the zirconia crystals that comprised the surface coating, so long as the other synthesis conditions were kept the same. Thus the concentration of zirconia sol may be used to adjust and/or control the size and shape of the nanocrystals in the coating layers and the amount of free nanocrystals.

Figure 4:
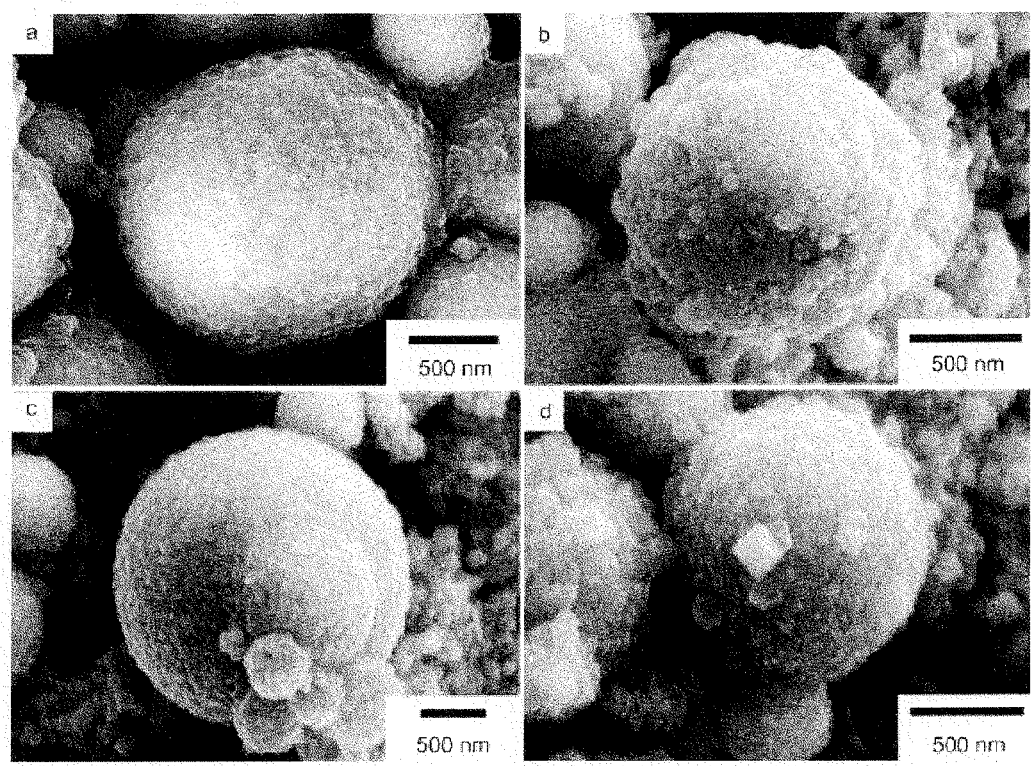

The morphology of the zirconia nanocrystals in the coating layers can be controlled by first introducing a silica primer layer first on CI particles. FIG. 4(a-d) show the SEM images of CI particles after being coated with a primer layer of silica first, followed by the growth of ZrO$_2$ coating from solutions with different amounts of zirconia sol. Silica layers were produced from APTMS ((3-aminopropyl)trimethoxysilane) (H$_2$N(CH$_{2H}$Si(OCH$_3$)$_3$) and appeared to alter the growth of zirconia crystals, resulting in a coating with the different surface texture and morphology. With a primer layer of alkoxide-derived silica, the zirconia crystals became less faceted and the coating surface became smoother than those coated directly with zirconia. For example, FIGS. 4(a-d), respectively, show SEM images of SiO$_2$—ZrO$_2$ coated CI particles made from different (a) 5%, (b) 10%, (c) 20%, and (d) 30% zirconia sol precursors. The change of morphology may be due to the high flexibility of bond angles between silicon and oxygen atoms and rich hydroxyl function groups on the reacting surface of silica. Such new surface may anchor the zirconia nuclei quite differently and result in the growth of a large number of small ZrO$_2$ crystallites. We increased the coverage and thickness of crystallites on silica-coated CI surfaces as a function of volume ratio of zirconia sol used. The portion of free zirconia crystals formed could also be increased with the amount of zirconia sol. The density for zirconia (10 vol. %) coated CI particles based on 22 measurements on particles from seven batches were determined to be 6.72±0.08 g/cm$^3$ using a gas pycnometer. This value was slightly lower than that for the uncoated CI particles, which was 7.68±0.04 g/cm$^3$ based on four measurements.

FIG. 1c shows the steps for preparing, via a sol-gel synthesis procedure, a 50 g batch of zirconia/silica double-layer coated CI at 10 vol. % zirconia sol according to a non-limiting, exemplary embodiment of the invention.

Zirconia/silica double layer-coated particles were prepared in two steps. First, a thin silica layer was generated on the surface of CI particles. In this step, 50 g of CI particles were dispersed in 1 L of ethanol in a 2-L beaker. The CI dispersion in ethanol was then sonicated in a sonication bath for 30 min at room temperature, after which the mixture was transferred to a 2-L round bottomed flask. The silica sol was formed by adding 5.6 mL of DI water to the mixture, followed by the addition of 10.5 mL of APTMS according to the Stöber method. The flask containing the mixture was placed in a water bath heated up to 70° C. on a hot plate. The mixture was stirred using a mechanical stirrer set to 60 rpm for 4 h. The CI particles were then separated from the liquid using a permanent bar magnet, and washed once with 500 mL of ethanol and twice with 500 mL of DI water. In the second step, zirconia coating was deposited onto the silica layer. In this step, the wet silica coated CI particles were weighed to determine the residual amount of water in the batch. DI water was then added to the batch of silica coated CI particles to make up 900 mL of water in the mixture, followed by the addition of 100 mL of zirconia sol and preparation procedures as described above.

Contact angle testing was performed with a video microscope system to investigate the affinity of the CI powder for water. Uncoated and coated CI powder samples were prepared as ~100 μm thick dry films on glass microscope slides by a simple hand pressing/compacting process. A single drop of DI water (~4 μL) was placed onto each film surface and viewed in the microscope. For both powder samples, the first drop was absorbed. However, deposition of a second drop onto the surface of the uncoated powder film at the same location resulted in preserved drop whose contact angle was ~90 degrees. With the deposition of four drops, it was possible to measure a contact angle for the coated powder film, and the resulting contact angle was found to be ~12 degrees. This test was repeated at several randomly chosen locations for each powder film with the same results. Thus the initially uncoated CI powder is hydrophobic; it becomes hydrophilic after application of the sol-gel zirconia treatment process. Hydrophilic, coated particles can then be used directly to make an aqueous slurry for magnetorheological finishing. They can also be incorporated into an aqueous MR suspension at a high solids loading (40 vol. %) through the use of an anionic surfactant or dispersing agent, such as for example, diammonium citrate-DAC or Darvan CN. The resulting measured viscosity of 70 cP at a shear of 761/s is low enough to be pumped in a magnetorheological finishing machine (MRF). The resulting MR fluid with a pH of 8 should provide good polishing benefits. The mass magnetic susceptibility of the coated magnetizable particles is similar or the same as that for uncoated magnetizable particles.

Off-line viscosity measurements were performed using a cone and plate style viscometer, temperature stabilized at 25±0.5 degrees C. Several 50 ml batches of coated CI powder in DI water were prepared with solids concentrations of 35 and 40 vol. %. The coated powder was added in a series of small portions to DI water without any other dispersing agents. Hand shaking was performed for a portion, followed by high shear mixing for 5 minutes. This procedure was repeated in increments to elevate the solids concentration. Uniformly dispersed slurries were ultimately produced. A 0.5 ml sample was extracted from a batch and injected into the viscometer for measurement. Viscosity as a function of shear rate from 50 s−1 to 1000 s−1 was recorded. Measurements were obtained at a 35 vol. % solids concentration, where the fluid exhibited shear thinning behavior. Because the shear rate of the MR fluid leaving the nozzle of the STM (i.e., spot taking machine having characteristics similar to those of a conventional MRF machine. The STM is limited to part motion up and down into the MR fluid ribbon, under computer control, but without workpiece rotation capabilities) is ~800 s−1, attention was focused on the MR fluid viscosity at this shear rate. The 35 vol. % coated CI particle viscosity at 800 s−1 was found to be 110±11 cP (average of three separate measurements). For comparison, commercial ceria-based and nanodiamond-based MR fluids were prepared and evaluated under identical conditions. Their viscosities at a shear rate of 800 s−1 were found to be 89±2 cP and 111±13 cP, respectively. It was concluded that a water-based, 35 vol. % solids concentration, coated CI particle MR fluid could be successfully pumped and circulated in the STM.

Using our synthesis process, we successfully produced >4 kg of zirconia coated CI powder. However, only ~2.3 kg of powder were needed to prepare a sufficient volume of MR fluid (i.e., 1 L) to begin tests on the STM. The coated CI powder was slowly added to the water while mixing at ~1000 rpm (comparable to the mixing speeds used in the STM fluid reservoir) until a uniform slurry (as inspected by eye) was achieved.

Glycerol may be used to promote stabilization and reduce sedimentation. The interaction of glycerol with dispersing agents like Darvan C can improve the performance of the surfactant. Glycerol was found to be useful in the formulation of the zirconia/silica coated HQ carbonyl iron slurry. The mixture of 2 volume percent glycerol/1 volume percent DAC provided optimal experimental results.

In different exemplary aspects, the use of zirconia sol between 5 and 50 vol. % were examined based on the same general protocols as used for the 10 vol. % procedures described above.

Figure 5:
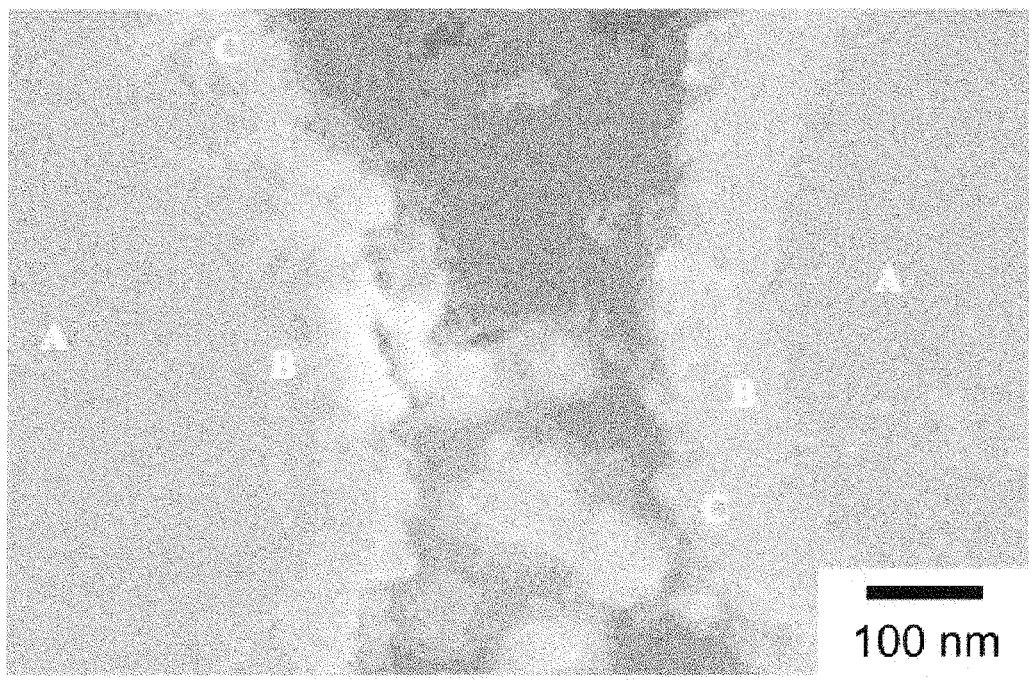

Referring again to the zirconia coated CI particles, the zirconia coating was characterized with SEM using a specimen prepared by embedding coated CI particles in an epoxy block whose surface was subsequently polished to expose the cross-section of the particles. FIG. 5 shows the cross-sections for 10 vol % zirconia coated CI particles. There were three regions in these core-shell particles. Region A was the iron core, and Region C was the zirconia particulate coating layers of zirconia crystals. The interface between the CI cores and the zirconia coating, i.e., the Region B, appeared to have lighter contrast than the iron cores. This region was most likely composed of the oxidized iron, i.e., magnetite. Such iron oxide layer may have facilitated the formation of strong chemical bond between the CI particles and hydroxyl species for the coated materials. The average thickness of zirconia layer was around or less than 50 nm.

Figure 6:
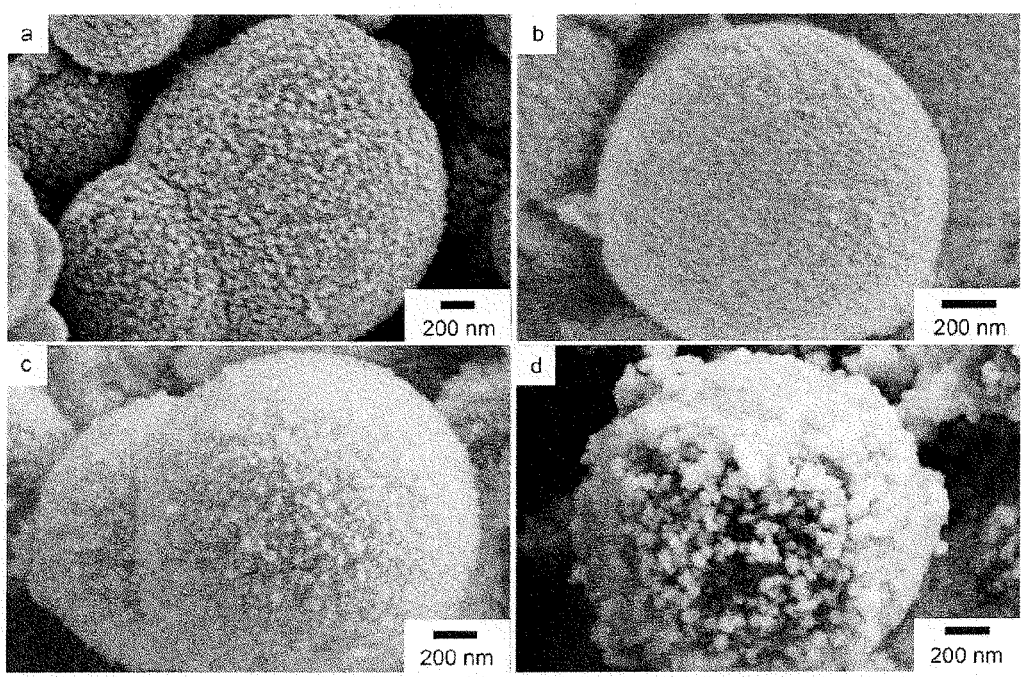

In our experiments, the thickness of the zirconia coating could be varied from 20 to 70 nm, depending on the amount of precursors and reaction conditions. In our sol-gel procedure, nitric acid was used as a catalyst and its concentration could influence the morphology and size of zirconia crystals in the coating layer. Low volume ratios of zirconia sol were used to examine the formation of coating layer at the early stage. FIGS. 6(a-d) show the CI particles coated with zirconia made from 5 and 10 vol % zirconia sols at two different amounts of nitric acid (36.5 and 146 mL), respectively. The average size of zirconia particles was the smallest among the four conditions when relatively small amount of zirconia sol and large amount nitric acid were used. Moreover, the larger the amount of nitric acid, the rougher the coating surface became. When relatively small amount of nitric acid was used, the coating surface became continuous but was largely made of relatively small crystals. This phenomenon could come from the condition that, at a relatively low sol concentration, zirconium alkoxide precursors hydrolyzed and formed the coating layer on the CI particles through the thermodynamically favored heterogeneous nucleation and growth process, and few free zirconia crystals were generated. When a large amount of nitric acid was used in the preparation, the zirconia sol could complete the polycondensation step rapidly; this favored the homogeneous growth. Experimentally, we observed that the reaction mixture became clear in less than 3 h when 146 mL of nitric acid was used. For the reaction catalyzed by 36.5 mL of nitric acid, the sol became clear overnight.

Figure 7:
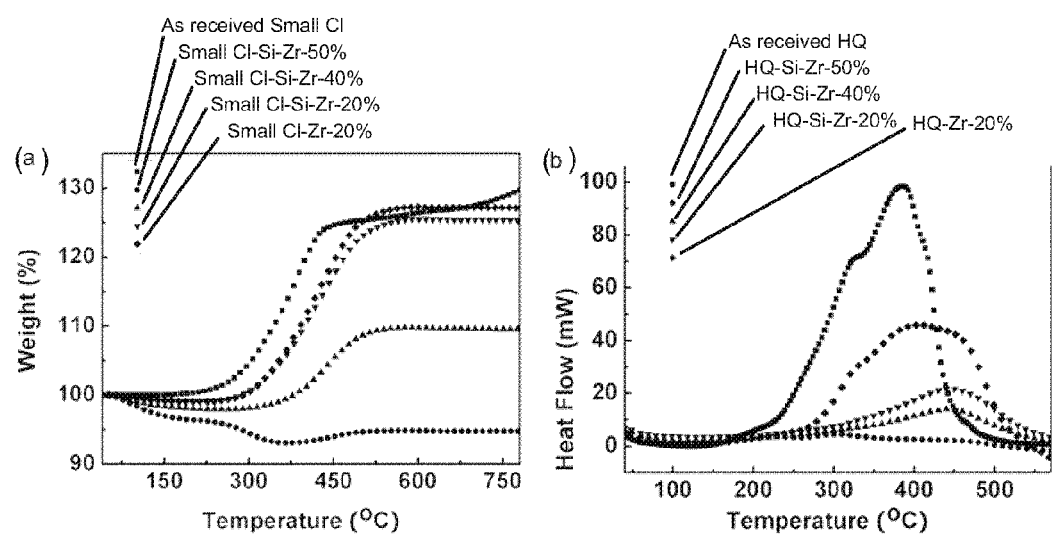

Thermal gravimetric analysis (TGA) was performed on the CI particles coated with zirconia under an air flow to study the oxygen resistance. In these tests, the oxidation of iron by oxygen from air resulted in a weight gain of CI particles. Thus the onset temperature of weight gain is used to evaluate the oxidation resistance effect of zirconia coatings on the CI particles. The shift of this onset to a high temperature indicates the improvement in the protection of iron cores against the oxidation. FIGS. 7a, 7b show the typical TGA and the corresponding heat flow curves for both zirconia (small CI—Zr) and zirconia/silica (small CI—Si—Zr) coated CI particles. The TGA data indicate that both types of coating could retard the oxidation of CI particles by air (FIG. 7a). The onset of weight gain changed from 275° C. for the uncoated to 325° C. for the zirconia (20 vol %) coated CI particles.

Zirconia/silica coatings prepared using the 40 vol % sol solution offered even better protection, judging by the further increase of the onset temperature. For the samples made using 50 vol % sol solution, no weight gain was observed, which suggests that iron cores could not be readily oxidized up to the temperature tested, which was about 800° C. The observed weight loss could be due to the polycondensation of hydroxyl group of hydrated zirconia in both coating layer and as free nanocrystals.

These results can be further understood based on the heat flow measurements recorded simultaneously as the weight loss/gain curves (FIG. 7b). There was only a small heat flow peak centered around 450° C. for the sample made with 40 vol % sol solution, suggesting that there was little oxidation reaction and the activation of the reaction was at a relatively high temperature. In comparison, the uncoated particles had two large exothermic peaks on the heat flow curve at about 300° C. and 380° C., suggesting that they could be readily oxidized at much lower temperatures than those with $ZrO_2$ coatings. No major thermal event was observed for the coated samples made with 50 vol % of sol solution, further suggesting negligible oxidation of CI cores occurred in the temperature range measured.

The zirconia-coated CI particles also demonstrated a much improved resistance to acid corrosion. While the as-received CI particles could be easily corroded within 10 min. in a pH 4.4 acidic environment, the particles coated with either pure zirconia or zirconia/silica had excellent resistance.

Figure 8:
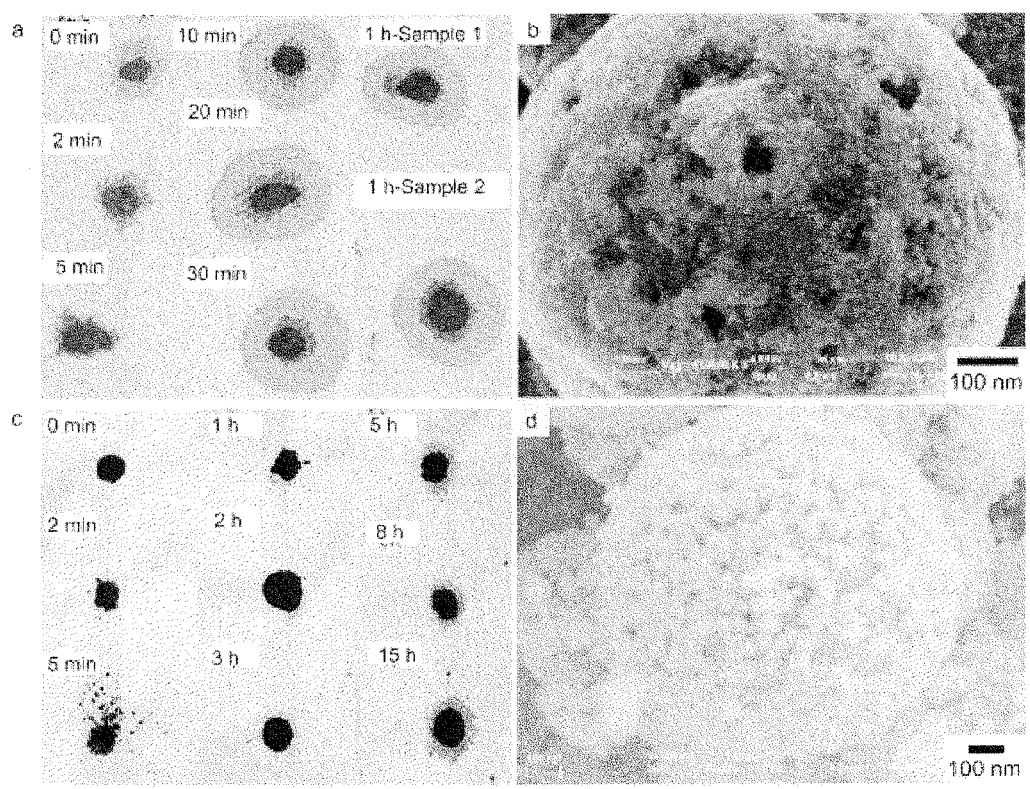

FIGS. 8(a-d) show the results of accelerated corrosion testing for two samples of the same CI powders with and without coating layers. In this procedure, a small amount of suspension of the CI particles was taken out and dropped on a piece of paper periodically after the particles were added to an acidic solution. The yellowish coloration on the paper in FIG. 8a is due to the acidic oxidation of metal iron to ferric ions and a qualitative indication of the corrosion. FIG. 8a shows the photograph of the uncoated CI particles that were exposed to an acidic solution for up to 1 h at 30 C. Corrosion commenced between 5 and 10 min of the exposure. FIG. 8b is a SEM image of a corroded uncoated CI particle after 20 min of exposure and shows features of deep pitting. FIG. 8c shows a photograph of the accelerated acid corrosion test results for the same initial CI particles that were coated with a dual silica/zirconia (from 50 vol % sol) layer on the CI particles. No change of color, i.e., the corrosion, was observed after 15 h of exposure at 60 C, when the test was terminated. FIG. 8d shows a SEM image of a zirconia-coated CI particle after acid exposure for over 150 h at 60 C. No pitting was observed. These acidic corrosion test results were in good agreement with the thermogravimetric analyses for oxygen corrosion study, suggesting that the coating could be very effective at retarding different kinds of corrosions.

In various aspects of the embodiments described herein, the magnetic material may be in the form of magnetizable particles, which can be paramagnetic, superparamagnetic, ferromagnetic compounds, or a combination thereof. Non-limiting examples of specific magnetizable particle materials include iron, iron oxide, iron nitride, iron carbide, carbonyl iron, chromium dioxide, low carbon steel, silicon steel, nickel, cobalt, or a combination thereof. The size of the magnetizable particles can range from about 0.2 µm to about 20 µm.

In various aspects of the embodiments described herein, the ceramic coating material may include one of zirconia, alumina, ceria, tin oxide, titanium oxide, cerium oxide, iron oxides (including maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, and a combination thereof.

In various aspects of the embodiments described herein, the primer layer disposed immediately intermediate the exterior surface of the magnetizable particle and the nanocrystalline ceramic coating layer may be zirconia, alumina, ceria, tin oxide, titanium oxide, cerium oxide, iron oxide (e.g., maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, or a combination thereof.

It is expected that MR fluids incorporating the coated particles described herein will enable the attainment of high UV laser damage thresholds on fused silica without a post-processing acid etching step as required for MR fluids in some prior art processes, such as in U.S. Pat. No. 6,920,765 to Menapace. Not being bound by any one theory, it is suggested that the higher laser damage thresholds would be due 1) to the ability to use zirconia in MR fluids of fused silica for the first time, and 2) the ability of the coated particles to enable lower normal loads to be applied to the part surface, thereby further reducing the carbonyl iron particle embedding problem. Currently, this problem requires that an acid etch be carried out on MR fluid-processed parts to remove these embedded carbonyl iron particles.

The embodiments herein may be used in a variety of abrasive finishing processes such as those disclosed in U.S. Pat. No. 5,971,835 to Kordonski, which is hereby incorporated by reference. The MR Jet polishing process is disclosed wherein an MR fluid performs precision polishing on part surfaces that cannot be reached with the conventional MRF wheel configuration. One example is the inside of conformal missile domes of interest to the military. The requirements for an MR Jet fluid are not necessarily the same as that for an MRF machine, since the fluid jet velocities, v, attained are much higher. The removal process is also somewhat different, being proportional to $v^3$, unlike the removal rate for MRF which is proportional to velocity, v.

Another potential use of the embodiments herein is in the application of Fluid Jet polishing (FJP), which was recently commercialized by Zeeko Technologies, Ltd. (Zeeko IRP 50 Micro polisher-2008). It is based upon work done by O. Fanhle [Appl Opt. 37 (1998) 6771-6773], and later by S. Booij [Opt. Eng. 41 (2002) 1926-1931], both publications hereby incorporated by reference. No magnetic field is used, but the types and quality of the abrasive particles are important to the surface smoothing. In her thesis, which is hereby incorporated by reference, J. DeGroote [University of Rochester (2007), Appendix B p. 166], describes experiments she conducted with carbonyl iron particles in the fluid jet polishing system at Fisba Optik, Switzerland. She found that, because of their round and smooth surfaces, carbonyl iron particles were less effective than SiC particles of the same nominal size at removing material. The sharp/faceted texture of zirconia-coated carbonyl iron particles described in the embodiments can be effective for applications like fluid jet polishing.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A powder precursor material composition for a magnetorheological fluid composition comprising:
    a magnetic particle; and
    a single zirconia ceramic material, wherein the powder precursor material composition is in a dried form and further wherein a portion of the single zirconia ceramic material is in the form of a nanocrystalline coating over the entire exterior surface of the magnetic particle and another portion of the same single zirconia ceramic material is in the form of a free nanocrystal.

2. The powder precursor material composition of claim 1, further comprising a layer of silica disposed immediately intermediate the exterior surface of the CI particle and the nanocrystalline zirconia coating.

3. The powder precursor material composition of claim 1, further comprising a layer of one of zirconia, alumina, ceria, tin oxide, titanium oxide, cerium oxide, iron oxide (e.g., maghemites, magnetite, hematite), cobalt oxide, nickel oxide, copper oxide, zinc oxide, silica, vanadium oxide, niobium oxide, molybdenum oxide, tungsten oxide, gallium oxide, indium oxide, bismuth oxide, and a combination thereof disposed immediately intermediate the exterior surface of the CI particle and the nanocrystalline zirconia coating.

4. A powder precursor material composition for a magnetorheological fluid composition comprising:
    a magnetic particle having a single zirconia ceramic material coating over an external surface thereof as a result of a coating process; and
    a free nanocrystal of the same single zirconia ceramic material in the form of a residual by-product of the coating process.

* * * * *